US011283627B2

(12) United States Patent
Zhu (10) Patent No.: US 11,283,627 B2
(45) Date of Patent: Mar. 22, 2022

(54) METHOD AND APPARATUS FOR GENERATING BLOCKCHAIN TRANSACTION

(71) Applicant: Advanced New Technologies Co., Ltd., Grand Cayman (KY)

(72) Inventor: Xiaofeng Zhu, Zhejiang (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

(21) Appl. No.: 17/323,903

(22) Filed: May 18, 2021

(65) Prior Publication Data

US 2021/0273818 A1    Sep. 2, 2021

Related U.S. Application Data (63) Continuation of application No. PCT/CN2019/126047, filed on Dec. 17, 2019.

(30) Foreign Application Priority Data

Jan. 18, 2019 (CN) .......................... 201910046918.2

(51) Int. Cl.
*H04L 29/06* (2006.01)
*H04L 9/32* (2006.01)

(52) U.S. Cl.
CPC .......... *H04L 9/3263* (2013.01); *H04L 9/3247* (2013.01)

(58) Field of Classification Search
CPC .................. H04L 9/3263; H04L 9/3247
See application file for complete search history.

(56) References Cited

U.S. PATENT DOCUMENTS 10,114,969 B1   10/2018  Chaney et al.
10,250,383 B1*  4/2019  Kumar .................. H04L 9/3271
(Continued)

FOREIGN PATENT DOCUMENTS

CN   106549933 A    3/2017
CN   107292621 A   10/2017
(Continued)

OTHER PUBLICATIONS

Yu et al., "Internet of Things Security and Privacy-Preserving Method Through Nodes Differentiation, Concrete Cluster Centers, Multi-Signature, and Blockchain", International Journal of Distributed Sensor Networks, vol. 14(12), 2018, 15 pages.

*Primary Examiner* — Ghodrat Jamshidi
(74) *Attorney, Agent, or Firm* — Seed IP Law Group LLP (57) ABSTRACT

One or more implementations of the present specification provide a data processing method and apparatus for a blockchain member node, where the blockchain member node includes a plurality of service servers, and at least one authentication module runs on each service server; and a public key of an authentication module of the at least one authentication module is authenticated by the blockchain. The method includes: obtaining, by a downstream service server of the plurality of service servers, a first service processing result and a first digital signature that are generated by an upstream service server of the plurality of service servers; verifying the first digital signature based on a public key of an authentication module running on the upstream service server; performing service processing based on the first service processing result after the verification succeeds, thereby generating a second service processing result; and generating a second digital signature by performing digital signing based on at least the second (Continued)

service processing result using an authentication module running on the downstream service server.

20 Claims, 5 Drawing Sheets

(56) References Cited

U.S. PATENT DOCUMENTS

| | | | |
|---|---|---|---|
| 10,506,104 B1* | 12/2019 | Shakeri | H04M 3/42042 |
| 10,535,062 B1* | 1/2020 | Rule | G06Q 20/326 |
| 11,017,090 B2* | 5/2021 | Jacquin | H04L 9/0643 |
| 2009/0077060 A1* | 3/2009 | Sermersheim | G06F 16/83 |
| 2010/0325654 A1* | 12/2010 | Moroney | H04L 12/281 |
| | | | 725/30 |
| 2011/0118809 A1* | 5/2011 | Rossi | A61N 1/3603 |
| | | | 607/60 |
| 2017/0180134 A1 | 6/2017 | King | |
| 2018/0082290 A1 | 3/2018 | Allen et al. | |
| 2018/0176018 A1* | 6/2018 | Chen | H04L 9/3297 |
| 2018/0183587 A1* | 6/2018 | Won | H04L 9/0891 |
| 2018/0276668 A1* | 9/2018 | Li | G06Q 20/3825 |
| 2019/0268310 A1* | 8/2019 | Guberman | H04L 67/12 |
| 2019/0288854 A1* | 9/2019 | Xie | H04L 9/3218 |
| 2019/0327223 A1* | 10/2019 | Kumar | H04L 9/3213 |
| 2020/0052903 A1* | 2/2020 | Lam | H04L 9/3218 |
| 2021/0136572 A1* | 5/2021 | Ingraham | H04W 12/069 |

FOREIGN PATENT DOCUMENTS

| | | |
|---|---|---|
| CN | 107579951 A | 1/2018 |
| CN | 108055236 A | 5/2018 |
| CN | 108259467 A | 7/2018 |
| CN | 108604344 A | 9/2018 |
| CN | 108737436 A | 11/2018 |
| CN | 109003083 A | 12/2018 |
| CN | 109190409 A | 1/2019 |
| CN | 110046996 A | 7/2019 |
| TW | 201837797 A | 10/2018 |
| WO | WO 2018/177239 A1 | 10/2018 |

* cited by examiner

METHOD AND APPARATUS FOR GENERATING BLOCKCHAIN TRANSACTION

BACKGROUND

Technical Field

The present specification relates to the field of data processing technologies, and in particular, to a method and an apparatus for generating a blockchain transaction.

Description of the Related Art

The blockchain technology, also referred to as the distributed ledger technology, is an emerging technology in which several computing devices participate in "accounting" to jointly maintain a complete distributed database. Since the blockchain technology has the characteristics of being decentralized, open and transparent, each computing device can participate in database recording, and data synchronization can be quickly performed between the computing devices, the blockchain technology has been widely applied in many fields.

BRIEF SUMMARY

The present specification provides a data processing method for a blockchain member node, where the blockchain member node includes a plurality of service servers, and at least one authentication module runs on each service server; a public key of an authentication module of the at least one authentication module is authenticated by the blockchain; and the method includes: obtaining, by a downstream service server of the plurality of service servers, a first service processing result and a first digital signature that are generated by an upstream service server of the plurality of service servers, the first digital signature being made by an authentication module running on the upstream service server based on at least the first service processing result; verifying the first digital signature based on a public key of the authentication module running on the upstream service server; performing service processing based on the first service processing result after the verification succeeds, thereby generating a second service processing result; and generating a second digital signature by performing digital signing based on at least the second service processing result using an authentication module running on the downstream service server.

In illustrated implementations, the method further includes: storing at least the second digital signature on the blockchain member node in a distributed way.

In illustrated implementations, the method further includes: generating a target transaction based on at least the second service processing result and the second digital signature in a determined, predetermined or dynamically determined, blockchain transaction format; and sending the target transaction to the blockchain for the target transaction to be verified through a node consensus of the blockchain and then included in a distributed database of the blockchain.

In illustrated implementations, the authentication module running on the upstream service server and the authentication module running on the downstream service server are a same authentication module; and the first service processing result is a ciphertext encrypted using the public key of the same authentication module; the obtaining the first service processing result generated by the upstream service server includes decrypting the first service processing result based on the authentication module, thereby obtaining a plaintext of the first service processing result; and the method further includes: encrypting the second service processing result based on the public key of the same authentication module.

In illustrated implementations, the public key of the authentication module is authenticated by the blockchain includes: an identity certificate of the authentication module is backed up in a distributed database of the blockchain; and the identity certificate includes the public key of the authentication module and an electronic signature made by an authentication node of the blockchain based on at least the public key of the authentication module.

The present specification further provides a data processing apparatus implemented by a blockchain member node, where the blockchain member node includes a plurality of service servers, and at least one authentication module runs on each service server; a public key of an authentication module of the at least one authentication module is authenticated by the blockchain; and the apparatus includes: an acquisition unit, configured to obtain a first service processing result and a first digital signature that are generated by an upstream service server of the plurality of service servers, the first digital signature being made by an authentication module running on the upstream service server based on at least the first service processing result; a verification unit, configured to verify the first digital signature based on a public key of the authentication module running on the upstream service server; a service processing unit, configured to perform service processing based on the first service processing result after the verification succeeds, thereby generating a second service processing result; and a digital signing unit, configured to generate a second digital signature by performing digital signing based on at least the second service processing result using an authentication module running on the downstream service server.

In illustrated implementations, the apparatus further includes: a storage unit, configured to store at least the second digital signature on the blockchain member node in a distributed way.

In illustrated implementations, the apparatus further includes: a transaction generating unit, configured to generate a target transaction based on at least the second service processing result and the second digital signature in a predetermined blockchain transaction format; and a transaction sending unit, configured to send the target transaction to the blockchain for the target transaction to be verified through a node consensus of the blockchain and then included in a distributed database of the blockchain.

In illustrated implementations, the authentication module running on the upstream service server and the authentication module running on the downstream service server are a same authentication module; and the first service processing result is a ciphertext encrypted using the public key of the same authentication module; the acquisition unit is further configured to decrypt the first service processing result based on the authentication module, thereby obtaining a plaintext of the first service processing result; and the apparatus further includes an encryption unit, configured to encrypt the second service processing result based on the public key of the same authentication module.

In illustrated implementations, the public key of the authentication module is authenticated by the blockchain includes: an identity certificate of the authentication module is backed up in a distributed database of the blockchain; and the identity certificate includes the public key of the authentication module and an electronic signature made by an authentication node of the blockchain based on at least the public key of the authentication module.

The present specification further provides a computer device, including: a storage device and a processor, where the storage device stores a computer program that can be run by the processor; and when the processor runs the computer program, the steps described in the data processing method performed by the blockchain member node are performed.

The present specification further provides a computer readable storage medium storing a computer program thereon, where when a processor runs the computer program, the steps described in the data processing method performed by the blockchain member node are performed.

As can be seen from the above technical solution, the data processing method and apparatus provided in the present specification are implemented by a blockchain member node including a plurality of service servers, and digital signature authentication is performed on service data generated during service processing of each service server by using an authentication module registered and authenticated on the blockchain, so as to prevent data from being tampered with and other security risks when being transmitted between servers inside the blockchain member node.

DETAILED DESCRIPTION

Example implementations will be described in detail herein with reference to the accompanying drawings. When the following description refers to the drawings, the same numbers in different drawings indicate the same or similar elements unless otherwise indicated. The example implementations described below do not represent all implementations consistent with one or more implementations of the present specification. Rather, they are merely examples of apparatuses and methods consistent with aspects of one or more implementations of the present specification as detailed in the appended claims.

It should be noted that, in other implementations, the steps of the corresponding method are not necessarily performed in the order shown and described in the present specification. In some other implementations, the method can include more or fewer steps than those described herein. In addition, the individual steps described in the present specification can be broken down into a plurality of steps in other implementations for description; a plurality of steps described in the present specification can also be combined into a single step in other implementations for description.

The blockchain described in the present specification can specifically refer to a P2P network system having a distributed data storage structure and achieved by each node through a consensus mechanism. The data in the blockchain is distributed in blocks connected in terms of time, the latter block contains a data digest of a previous block, and a full data backup of all or some of nodes is achieved according to different specific consensus mechanisms (such as Proof of Work (PoW), Proof of Stake (PoS), Delegated Proof of Stake (DPoS) or Practical Byzantine Fault Tolerance (PBFT)). It is well known to a person skilled in the art that since a blockchain system operates under a corresponding consensus mechanism, it is difficult for any node to tamper with data already recorded in a blockchain database. For example, if a blockchain of the POW consensus is used, it is possible to tamper with the existing data only with an attack of at least 51% of the computing power of the whole network. Therefore, the blockchain system delivers highly impressive data security with an anti-tampering feature compared to other centralized database systems.

Currently, a blockchain can be deployed in a variety of forms, such as a private blockchain, a consortium blockchain, and a public blockchain. It is possible to avoid tampering and denying of bottom-layer data of a distributed database that is finally sent by a blockchain node to the blockchain, depending on the features of a decentralized distributed ledger. However, since a tamper-proof mechanism of a blockchain system cannot cover an application scenario where the blockchain node is involved, even though a blockchain technology is used at a bottom layer (or a most downstream service server) of the blockchain node, an information security risk still exists when data is written or read on a plurality of service layers (or a plurality of upstream service servers) starting from a top layer in the application scenario.

Figure 1:
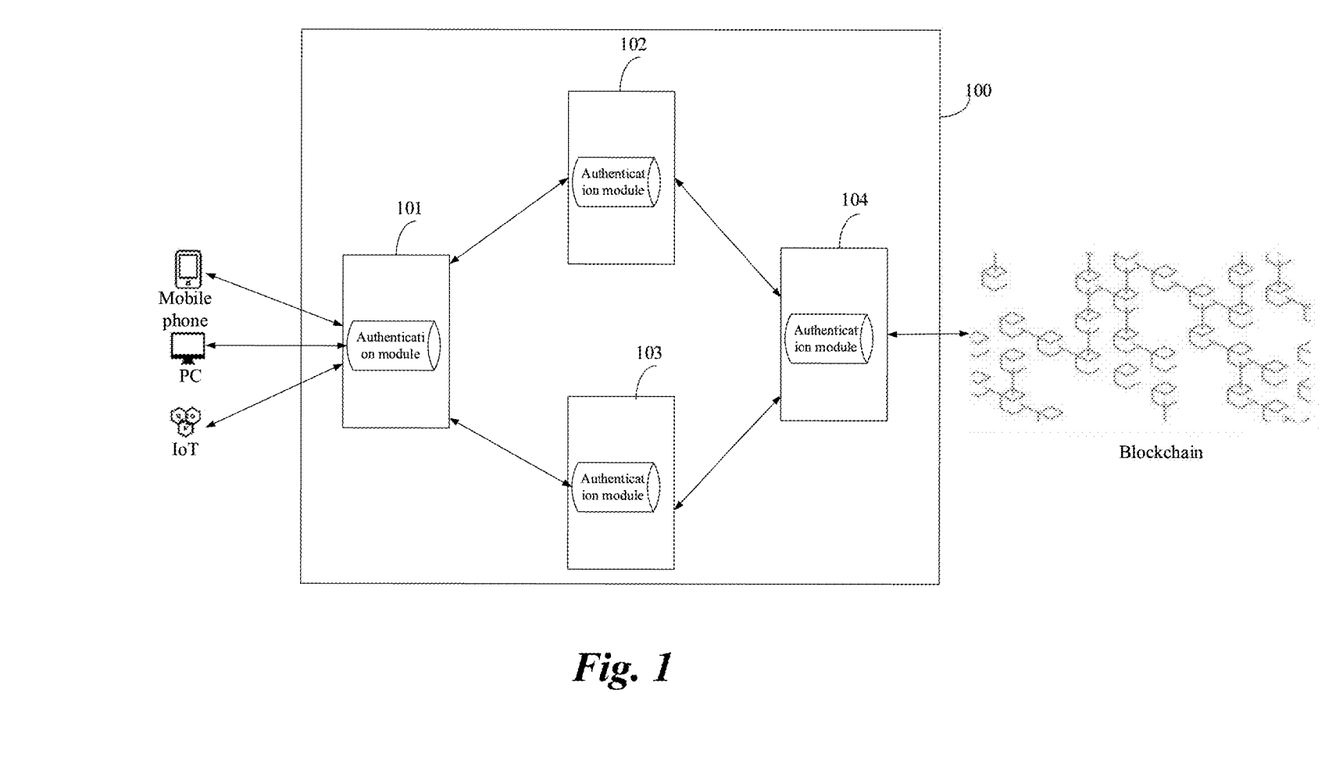
FIG. 1 is a schematic system diagram illustrating a blockchain node according to an implementation of the present specification.

In view of the problems of the existing solutions, an implementation of the present specification provides a data processing method for a blockchain member node. As shown in FIG. 1, the blockchain member node 100 can be provided with a plurality of service servers 101-104 based on its service processing process, and each service server is configured to execute a corresponding service processing sub-process. As is well known to those skilled in the art, a downstream service server receives a service processing result of an upstream service server, so as to execute a service processing sub-process corresponding to the downstream service server based on the upstream service processing result.

It should be noted that the specification does not limit the specific server connected to a blockchain network in the blockchain member node, and the server can be one or more servers included in the blockchain member node.

Each service server shown in FIG. 1 runs at least one authentication module whose public key is authenticated by the blockchain. Accordingly, the authentication module can digitally sign (or "mark") a service processing result of each service server by using a private key corresponding to the public key authenticated by the blockchain, so as to prevent the service processing result of each service server from being tampered with during storage or transmission.

The authentication module described in this implementation can be a functional module implemented by software (for example, a modular SDK), or can be a functional module implemented by a combination of software and hardware. The public key of the authentication module can be authenticated by the blockchain in many ways. For example, the blockchain includes an authentication node that has the right to authenticate the identity of the authentication module, and the authentication node can issue an identity certificate (or a public key or a private key representing the identity of the authentication module) to the authentication module to authenticate the identity of the authentication module, and back up the identity certificate in a distributed database of the blockchain. It will be appreciated by those skilled in the art that the above identity certificate should include at least the public key of the authentication module and an electronic signature made by the authentication node of the blockchain based on at least the public key of the authentication module.

For another example, a smart contract for authenticating the public key of the authentication module can be deployed in the blockchain; the blockchain member node sends a target authentication transaction to the blockchain, where the target authentication transaction can include the public key of the authentication module selected by the blockchain member node; and the smart contract is invoked to execute identity authentication logic for the blockchain member node and authentication logic for the public key of the authentication module, so as to output the public key of the authentication module that is authenticated by the smart contract and is available to the blockchain member node.

By authenticating the public key of the authentication module in the blockchain as described in the above implementations, the authentication module is assigned, based on the consensus mechanism of the blockchain, a legal identity that cannot be tampered with. It should be noted that the blockchain member node can correspond to one legal valid authentication module, or can correspond to a plurality of legal valid authentication modules (having different public keys authenticated by the blockchain), which is not limited in the present specification.

Figure 2:
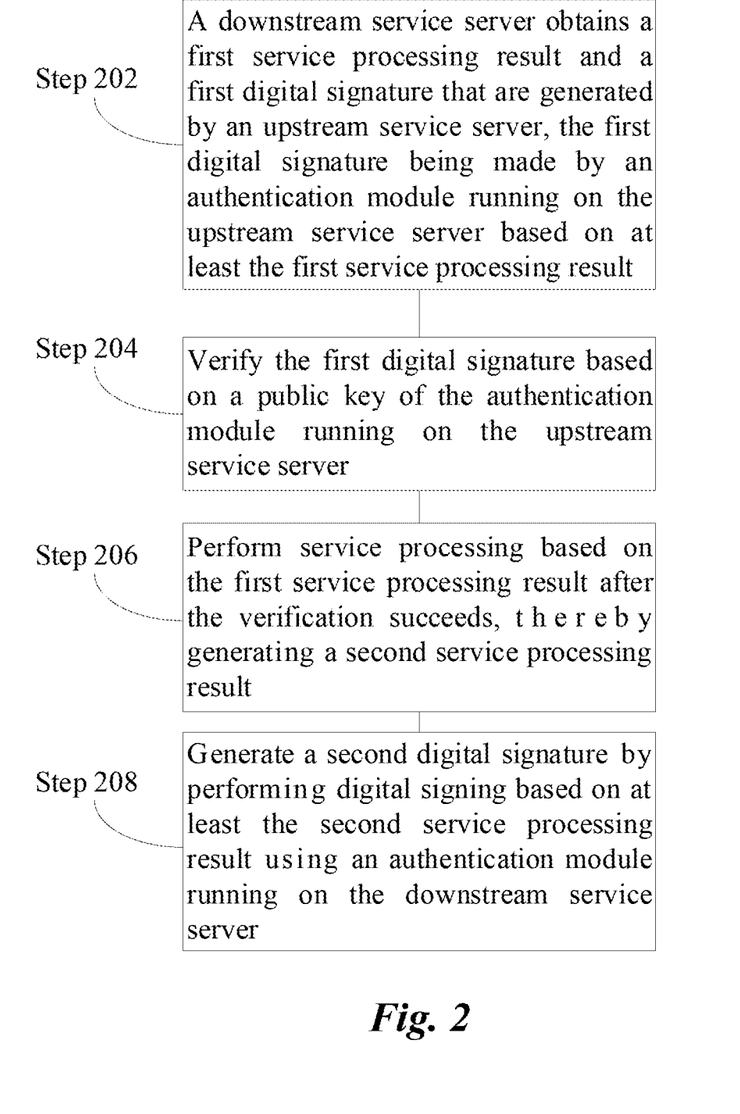
FIG. 2 is a flowchart illustrating a data processing method according to an implementation of the present specification.

As shown in FIG. 2, the data processing method according to the present implementation includes:

Step 202: A downstream service server included in the blockchain member node obtains a first service processing result and a first digital signature of an upstream service server of the plurality of service servers, the first service processing result being a service processing result generated by the upstream service server based on service processing, and the first digital signature being made by an authentication module running on the upstream service server based on at least the first service processing result.

This implementation does not limit the specific method in which the downstream service server obtains the first service processing result and the first digital signature of the upstream service server. The upstream service server can directly transmit one or more of the first digital signature or the first service processing result to the downstream service server after the service processing is completed, so the downstream service server obtains one or more of the first digital signature or the first service processing result during communication with the upstream service server.

Or the upstream service server can store one or more of the first digital signature or the first service processing result in a storage apparatus or a storage server provided by the blockchain member node after the service processing is completed, so the downstream service server can invoke the first digital signature and the first service processing result from the storage apparatus or the storage server.

Or the upstream service server can directly transmit the first service processing result to the downstream service server after the service processing is completed, and store the first digital signature in the storage apparatus or the storage server, so the downstream service server obtains the first service processing result during communication with the upstream service server, and invokes the first digital signature from the storage apparatus or the storage server when necessary to verify whether the first service processing result is tampered with.

When the upstream service server stores the first digital signature or the first digital signature and the first service processing result in the storage apparatus or a storage device of the blockchain member node, in order to prevent the first service processing result or the first digital signature from being maliciously tampered with or damaged during storage, the blockchain member node can adopt a distributed storage mode, that is, the first service processing result or the first digital signature is repeatedly stored in a plurality of servers of the blockchain member node to ensure data security.

In another illustrated implementation, the authentication module running on the upstream service server and the authentication module running on the downstream service server are a same authentication module, that is, the authentication module running on the upstream service server and the authentication module running on the downstream service server have the same public/private key. In order to ensure data security of the first service processing result and prevent key information (such as privacy information) from being leaked after the first service processing result is stolen, the first service processing result is a ciphertext encrypted using the public key of the same authentication module. Accordingly, the obtaining the first service processing result generated by the upstream service server includes decrypting the first service processing result based on the private key of the same authentication module, thereby obtaining a plaintext of the first service processing result.

Step 204: Verify the first digital signature based on the public key of the authentication module running on the upstream service server.

The specific process of verifying the first digital signature can include: decrypting the first digital signature using the public key of the authentication module to obtain a hash digest of an original first service processing result, calculating a hash digest of the first service processing result obtained in the step, and comparing the two hash digests with each other to verify whether the first service processing result is the original text signed using the first digital signature. When the verification succeeds, it indicates that the first service processing result is the original text signed using the first digital signature.

Step 206: Perform service processing based on the first service processing result after the verification succeeds, thereby generating a second service processing result.

The downstream service server performs service processing based on the first service processing result according to a determined service processing sub-process to generate the second service processing result.

Step 208: Generate a second digital signature by performing digital signing based on at least the second service processing result using the authentication module running on the downstream service server.

It should be noted that the authentication module running on the downstream service server and the authentication module running on the upstream service server in this implementation can be a same authentication module (having the same public key/identity) or can be different authentication modules (having different public keys/identities).

So far, the downstream service server completes the process from data obtaining to service processing, and the authentication module completes the verification of the obtained data (the first service processing result) and the storage of the generated data (the second service processing result). The data security is ensured in the multi-service processing process performed by the plurality of downstream service servers included in the blockchain node. When the downstream service server needs to perform large-scale parallel service processing calculations, a plurality of authentication modules can be run to improve data processing efficiency.

It will be appreciated by those skilled in the art that the downstream service server described in the above implementation can be used as an upstream service server of another service server determined by a service process, so the method described in step 202 to step 208 can be implemented by the other service server, so as to ensure that the other service server completes verification of the obtained data (the second service processing result) and storage of the generated data by using the authentication module. By applying the method described in step 202 to step 208 to a full-process service processing server included in the blockchain member device, data security can be ensured in the full service processing process performed by the blockchain member node.

It should also be noted that, as shown in FIG. 1, the upstream-downstream relationship between the plurality of service servers included in the blockchain member node can be changed with the specific service process performed by the blockchain member node, which is not limited in the present specification.

In another illustrated implementation, to ensure data security of the second digital signature and the second service processing result generated by the downstream service server, the downstream service server can store the second digital signature and the second service processing result at the blockchain member node in a distributed method, that is, the second service processing result and the second digital signature are repeatedly stored in the plurality of servers of the blockchain member node as described above.

In another illustrated implementation, when the downstream service server described in the above implementation is a service server capable of issuing a transaction to the blockchain, the data processing method performed by the downstream service server further includes: generating a target transaction based on at least the second processing result and the second digital signature in a determined, predetermined or dynamically determined, blockchain transaction format; and sending the target transaction to the blockchain for the target transaction to be verified through a node consensus of the blockchain and then included in a distributed database of the blockchain.

The transaction (transaction) described in the present specification refers to data created by a terminal device through a blockchain client and requested to be finally issued to the distributed database of the blockchain. A transaction in a blockchain has a narrow sense and a broad sense. In a narrow sense, a transaction refers to a value transfer issued by a user or a server to a blockchain. For example, in a conventional Bitcoin blockchain network, a transaction can be a transfer initiated by a user in the blockchain. In a broad sense, a transaction refers to service data with a service intention issued by a user or a server to a blockchain. For example, in the implementations provided herein, the target transaction can be a service (for example, rental service, vehicle scheduling service, insurance claim service, credit service, or medical service) message or a service request with a service intention obtained by a blockchain member node in a service processing process performed by a plurality of service servers.

The detailed procedure for including the target transaction in the distributed database of the blockchain described in the above implementation can be specifically set according to the consensus mechanism and the transaction rules of the blockchain. In an illustrated implementation, the including the target transaction in the distributed database of the blockchain includes: a node having the accounting right in the blockchain adds the target transaction to a candidate block; determine a consensus accounting node meeting the blockchain consensus mechanism from the nodes having the accounting right; the consensus accounting node broadcasts the candidate block to a node of the blockchain; and after the candidate block is verified by a predetermined number of nodes of the blockchain, the candidate block is considered as the latest block and added to the distributed database of the blockchain.

In the above implementation, the node(s) having the accounting right refers to a node having the right to generate a candidate block. According to the consensus mechanism of the blockchain, a consensus accounting node can be determined from nodes where the candidate block has the accounting right, and the consensus mechanism can be PoW, PoS or DPoS.

PoS or DPoS is similar to PoW, and they are all commonly used to confirm a consensus accounting node in a public blockchain. In another illustrated implementation, to reduce transaction or data validation time, improve transaction throughput, and meet security and performance needs, a consortium blockchain architecture can be selected to construct the blockchain in the implementation provided in the present specification. The blockchain member node, or a government supervision organization node, etc., of service processing performed by the blockchain member node can be used as a pre-selected node of the consortium blockchain to participate in accounting of the block. The consensus process of the consortium blockchain is also controlled by the pre-selected node, and when a block is confirmed by a determined ratio (for example, 2/3) of nodes on the network, predetermined or dynamically determined, a transaction or data recorded by the block will be confirmed by the entire network.

The consortium blockchain usually adopts a consensus algorithm such as PoS, PBFT or Resource Aggregation for Fault Tolerance (RAFT). During implementation, before each round of consensus starts in the blockchain, a master node, for example, the consensus accounting node described in the above implementation, can be selected from the nodes in the blockchain (for example, during each round of consensus, a master node is selected, and other node devices serve as slave nodes), and the master node further initiates transaction verification and consensus, and creates a new block for the blockchain based on transaction data (or target data) passed by the consensus.

PBFT is a preferred implementation of the consortium blockchain consensus algorithm provided in the present specification. It can meet the need for high-frequency transactions because of high efficiency of consensus. For example, in this implementation, the blockchain member node can be used as a service handling platform to generate a corresponding target transaction based on frequently handled user service processing applications. In addition, the consensus delay is very low, and basically meets the need of real-time processing, so the target transaction can be quickly recorded in the new block of the blockchain in real time.

Further, a trusted node in the consortium blockchain network is used as a pre-selected accounting node, and both security and stability are considered. Further, the use of PBFT does not consume too much computation resources of computers and does not necessarily require token circulation, showing good availability.

It should also be noted that the data processing method provided in the present specification is based on an authentication module running in a service processor included in the blockchain member node, so data security in the full service processing process performed by the blockchain member node can be improved. The front-end server in the service processing process, for example, a front-end service server 101 included in the blockchain member node shown in FIG. 1, is used to receive service data transmitted by a user based on a mobile terminal, a PC, or an Internet of Things (IoT) device. The authentication module running on the front-end service server can digitally sign the service data sent by the user to provide tamper-proof evidence for the downstream service server to process the service data.

The present specification does not limit a public key-private key calculation generation algorithm of the authentication module, and a specific algorithm for performing data encryption based on the public key of the authentication module or performing digital signing based on the private key of the authentication module. It is well known to those skilled in the art that the Elliptic Curve Digital Signature Algorithm (ECDSA) and the Elliptic Curve Cryptography Algorithm (ECC) are generally preferred implementations because they have a higher level of security strength than other algorithms such as RSA.

Figure 4:
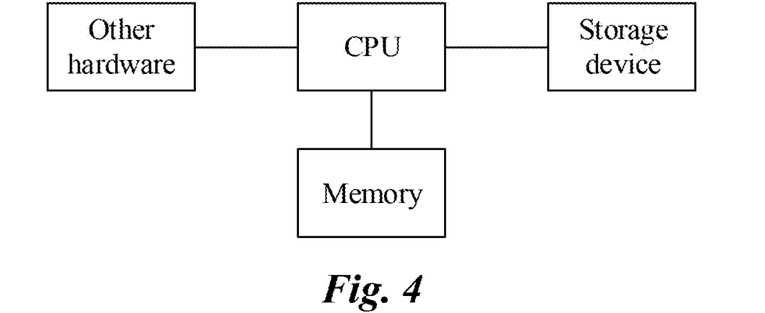
FIG. 4 is a hardware structural diagram illustrating an implementation of a data processing apparatus according to the present specification.

Corresponding to the above process implementation, an implementation of the present specification further provides a data processing apparatus 30. The apparatus 30 can be implemented by using software, or can be implemented by using hardware, or can be implemented by using a combination of hardware and software. Software implementation is used as an example. A logic apparatus is formed by reading a corresponding computer program instruction into a memory for running by using a central processing unit (CPU) in a device where the apparatus is located. At the hardware level, in addition to the CPU, the memory and the storage device shown in FIG. 4, the device on which data processing apparatus is implemented generally includes other hardware such as a chip for transmitting and receiving radio signals, and/or other hardware such as a board for implementing a network communication function.

Figure 3:
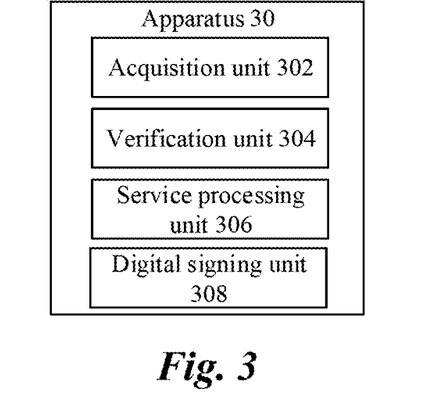
FIG. 3 is a schematic diagram illustrating a data processing apparatus according to an implementation of the present specification.

FIG. 3 further provides a data processing apparatus implemented by a blockchain member node, where the blockchain member node includes a plurality of service servers, and at least one authentication module runs on each service server; a public key of an authentication module of the at least one authentication module is authenticated by the blockchain; and the apparatus 30 includes: an acquisition unit 302, configured to obtain a first service processing result and a first digital signature that are generated by an upstream service server of the plurality of service servers, where the first service processing result is a service processing result of the upstream service server, and the first digital signature is made by an authentication module running on the upstream service server based on at least the first service processing result; a verification unit 304, configured to verify the first digital signature based on a public key of the authentication module running on the upstream service server; a service processing unit 306, configured to perform service processing based on the first service processing result after the verification succeeds, thereby generating a second service processing result; and a digital signing unit 308, configured to generate a second digital signature by performing digital signing based on at least the second service processing result using an authentication module running on the downstream service server.

In another illustrated implementation, the apparatus 30 further includes: a storage unit (not shown), configured to store at least the second digital signature on the blockchain member node in a distributed way.

In another illustrated implementation, the apparatus further includes: a transaction generating unit (not shown), configured to generate a target transaction based on at least the second service processing result and the second digital signature in a predetermined blockchain transaction format; and a transaction sending unit (not shown), configured to send the target transaction to the blockchain for the target transaction to be verified through a node consensus of the blockchain and then included in a distributed database of the blockchain.

In another illustrated implementation, the authentication module running on the upstream service server and the authentication module running on the downstream service server are a same authentication module; and the first service processing result is a ciphertext encrypted using the public key of the same authentication module; the acquisition unit is further configured to decrypt the first service processing result based on the authentication module, thereby obtaining a plaintext of the first service processing result; and the apparatus further includes an encryption unit (not shown), configured to encrypt the second service processing result based on the public key of the same authentication module.

In another illustrated implementation, the public key of the authentication module is authenticated by the blockchain includes: an identity certificate of the authentication module is backed up in a distributed database of the blockchain; and the identity certificate includes the public key of the authentication module and an electronic signature made by an authentication node of the blockchain based on at least the public key of the authentication module. For detailed implementation processes of functions and roles of the units in the above apparatus, references can be made to the implementation processes of corresponding steps in the above method. For related parts, references can be made to descriptions in the method implementation. Details are omitted here for simplicity.

The described apparatus implementation is merely an example. The units described as separate parts can or cannot be physically separate, and parts displayed as units can or cannot be physical modules, can be located in one position, or can be distributed on a plurality of network modules. Some or all of the units or modules can be selected based on actual needs to achieve the objectives of the solutions of the present specification. A person of ordinary skill in the art can understand and implement the implementations of the present specification without creative efforts.

The apparatuses, units, or modules illustrated in the above implementations can be implemented by computer chips, entities, or products having a certain function. A typical implementation device is a computer in the form of a personal computer, a laptop computer, a cellular phone, a camera phone, a smart phone, a personal digital assistant, a media player, a navigation device, an e-mail transceiver, a game console, a tablet computer, a wearable device, or any combination of at least two of these devices.

Corresponding to the above method implementation, an implementation of the present specification further provides a computer device, and the computer device includes a storage device and a processor. The storage device stores a computer program that can be executed by the processor. When running the stored computer program, the processor performs the steps of the data processing method performed by the blockchain member node in the implementation of the present specification. For a detailed description of each step of the data processing method performed by the blockchain member node, references can be made to the previous description, and no repeated description is given.

Corresponding to the above method implementation, an implementation of the present specification further provides a computer readable storage medium, and the storage medium stores a computer program. When the computer program is executed by a processor, the steps of the data processing method performed by the blockchain member node in the implementation of the present specification are performed. For a detailed description of each step of the data processing method performed by the blockchain member node, references can be made to the previous description, and no repeated description is given.

The above descriptions are merely preferred implementations of the present specification, and are not intended to limit the present specification. Any modification, equivalent replacement, improvement, etc., made without departing from the spirit and principles of the present specification shall fall within the protection scope of the present specification.

In a typical configuration, a computing device includes one or more processors (CPUs), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. Based on the definition in the present specification, the computer readable medium does not include transitory media such as a modulated data signal and carrier.

To provide further context for embodiments of this specification, and as introduced herein, distributed ledger systems (DLSs) (which can also be referred to as consensus networks, made up of peer-to-peer nodes), and blockchain networks, enable participating entities to securely and immutably conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, the recording of transactions on a blockchain is reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. Within a block, the transactions, which have already been verified by the nodes of the blockchain network, are hashed and encoded into a Merkle tree. The Merkle tree is a data structure in which each leaf node includes a hash on a corresponding transaction, and each non-leaf node includes a hash on the concatenation of the hashes in its children. With this process continuing up the tree to the root of the entire tree, the root node includes a hash that is representative of all data in the tree. A hash purporting to be of a transaction stored in the tree can be quickly verified by determining whether it is consistent with the structure of the tree.

Where a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. However, embodiments of this specification can be realized in any appropriate type of blockchain network.

In general, a consortium blockchain network is private among the participating entities. In a consortium blockchain network, the consensus process is controlled by an authorized set of nodes, referred to as consensus nodes, one or more of which are operated by a respective entity (a financial institution, insurance company, etc.). For example, a consortium of ten (10) entities (financial institutions, insurance companies, etc.) can operate a consortium blockchain network, each of which operates at least one node in the consortium blockchain network.

In some examples, within a consortium blockchain network, a global blockchain is provided as a blockchain that is replicated across all nodes. That is, all consensus nodes are typically in perfect state consensus with respect to the global blockchain. To achieve consensus (agreement to the addition of a block to a blockchain), a consensus protocol or algorithm is implemented within the consortium blockchain network. For example, the consortium blockchain network can implement a practical Byzantine fault tolerance (PBFT) consensus, described in further detail below.

Figure 5:
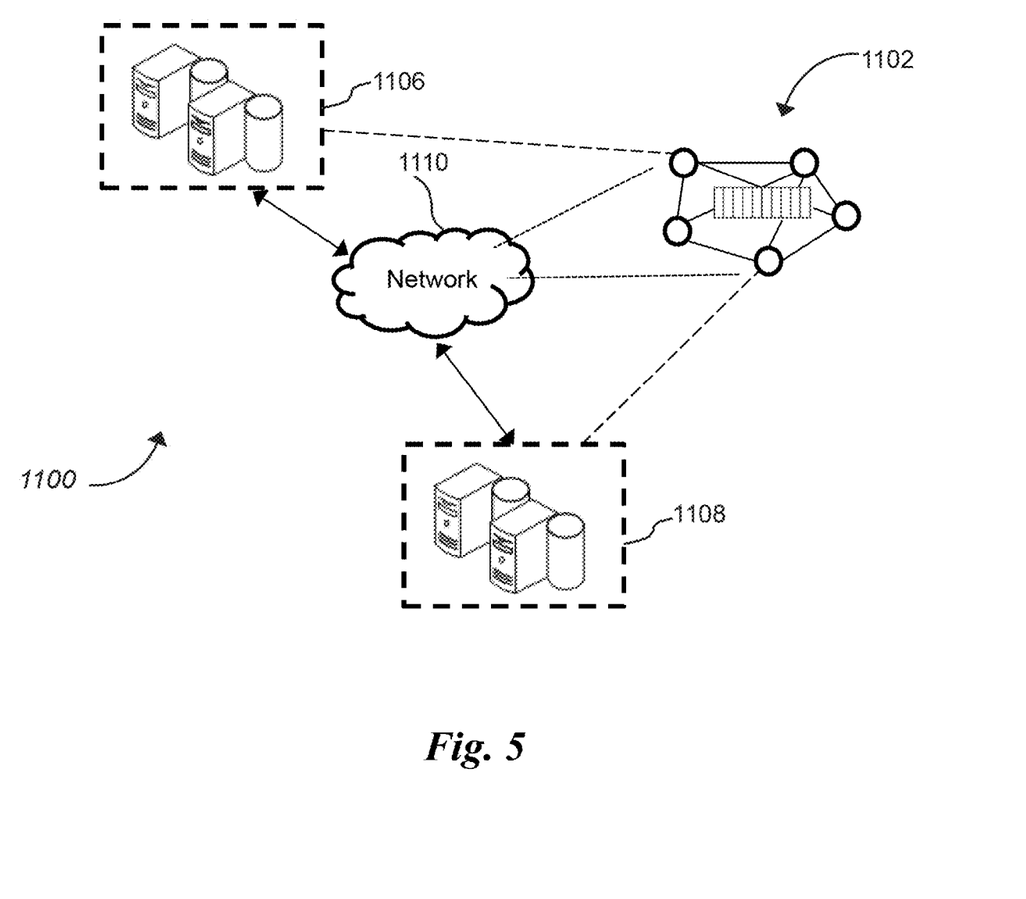
FIG. 5 is a diagram illustrating example environments that can be used to execute embodiments of this specification.

FIG. 5 is a diagram illustrating an example of an environment 1100 that can be used to execute embodiments of this specification. In some examples, the environment 1100 enables entities to participate in a consortium blockchain network 1102. The environment 1100 includes a plurality of computing devices 1106, 1108, and a network 1110. In some examples, the network 1110 includes a local area network (LAN), wide area network (WAN), the Internet, or a combination thereof, and connects web sites, user devices (computing devices), and back-end systems. In some examples, the network 1110 can be accessed over a wired and/or a wireless communications link. In some examples, the network 1110 enables communication with, and within the consortium blockchain network 1102. In general the network 1110 represents one or more communication networks.

In some cases, the network 1110 includes network hardware such as switches, routers, repeaters, electrical cables and optical fibers, light emitters and receivers, radio transmitters and receivers, and the like. In some cases, the computing devices 1106, 1108 can be nodes of a cloud computing system (not shown), or each computing device 1106, 1108 can be a separate cloud computing system including a number of computers interconnected by a network and functioning as a distributed processing system.

In the depicted example, the computing systems 1106, 1108 can each include any appropriate computing system that enables participation as a node in the consortium blockchain network 1102. Examples of computing devices include, without limitation, a server, a desktop computer, a laptop computer, a tablet computing device, and a smartphone. In some examples, the computing systems 1106, 1108 host one or more computer-implemented services for interacting with the consortium blockchain network 1102. For example, the computing system 1106 can host computer-implemented services of a first entity (user A), such as a transaction management system that the first entity uses to manage its transactions with one or more other entities (other users). The computing system 1108 can host computer-implemented services of a second entity (user B), such as a transaction management system that the second entity uses to manage its transactions with one or more other entities (other users). In the example of FIG. 5, the consortium blockchain network 1102 is represented as a peer-to-peer network of nodes, and the computing systems 1106, 1108 provide nodes of the first entity and second entity, respectively, which participate in the consortium blockchain network 1102.

Figure 6:
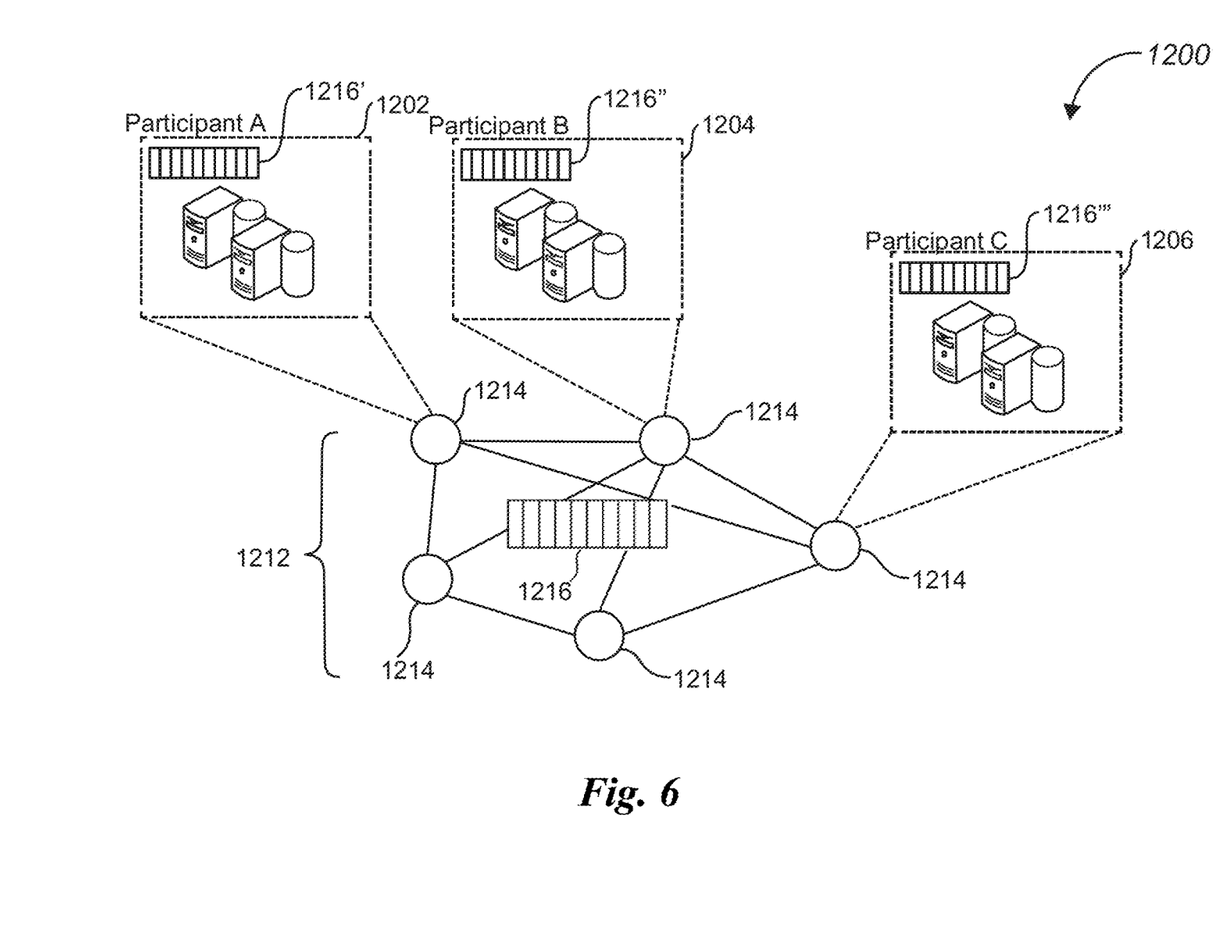
FIG. 6 is a diagram illustrating an example architecture in accordance with embodiments of this specification.

FIG. 6 depicts an example architecture 1200 in accordance with embodiments of this specification. The example architecture 1200 includes participant systems 1202, 1204, 1206 that correspond to Participant A, Participant B, and Participant C, respectively. Each participant (user, enterprise, etc.) participates in a blockchain network 1212 provided as a peer-to-peer network including a plurality of nodes 1214, at least some of which immutably record information in a blockchain 1216. Although a single blockchain 1216 is schematically depicted within the blockchain network 1212, multiple copies of the blockchain 1216 are provided, and are maintained across the blockchain network 1212, as described in further detail herein.

In the depicted example, each participant system 1202, 1204, 1206 is provided by, or on behalf of, Participant A, Participant B, and Participant C, respectively, and functions as a respective node 1214 within the blockchain network 1212. As used herein, a node generally refers to an individual system (computer, server, etc.) that is connected to the blockchain network 1212, and enables a respective participant to participate in the blockchain network. In the example of FIG. 6, a participant corresponds to each node 1214. It is contemplated, however, that a participant can operate multiple nodes 1214 within the blockchain network 1212, and/or multiple participants can share a node 1214. In some examples, the participant systems 1202, 1204, 1206 communicate with, or through, the blockchain network 1212 using a protocol (hypertext transfer protocol secure (HTTPS)), and/or using remote procedure calls (RPCs).

Nodes 1214 can have varying degrees of participation within the blockchain network 1212. For example, some nodes 1214 can participate in the consensus process (as miner nodes that add blocks to the blockchain 1216), while other nodes 1214 do not participate in the consensus process. As another example, some nodes 1214 store a complete copy of the blockchain 1216, while other nodes 1214 only store copies of portions of the blockchain 1216. For example, data access privileges can limit the blockchain data that a respective participant stores within its respective system. In the example of FIG. 6, the participant systems 1202, 1204 store respective, complete copies 1216', 1216", 1216''' of the blockchain 1216. In the descriptions herein, nodes 1214 of the blockchain network 1212 are also referred to as "participant user" for descriptive purposes. In some embodiments, some or all of the participant users 1214 participate in the consensus process and are referred to as "consensus nodes". The consensus nodes for the blockchain 1216 may also include other nodes not selected from the participant users 1214. In some other embodiments, consensus nodes for adding blocks to the blockchain 1216 do not overlap with the participant users 1214 that propose blocks to be added to the blockchain 1216.

A blockchain, such as the blockchain 1216 of FIG. 6, is made up of a chain of blocks, each block storing data. Examples of data include transaction data representative of a transaction between two or more participants. While transactions are used herein by way of non-limiting example, any appropriate data can be stored in a blockchain (documents, images, video, audio, etc.). Examples of a transaction can include, without limitation, exchanges of something of value (assets, products, services, currency, etc.) or occurrence of some events or activities. The transaction data is immutably stored within the blockchain. That is, an undetectable change cannot be made to the transaction data.

Before being stored in a block, the transaction data is hashed. Hashing is a process of transforming the transaction data, typically provided as string data, into a fixed-length hash value, typically provided as string data. It is not possible to un-hash the hash value to obtain the transaction data. Hashing ensures that even a slight change in the transaction data results in a completely different hash value. Further, and as noted above, the hash value is of a fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, for example, the consensus node generates a block header, hashes all of the transactions in the block, and combines the hash value in pairs to generate further hash values until a single hash value is provided for all transactions in the block (the Merkle root hash). This Merkle root hash is added to the block header. The consensus node also determines the hash value of the most recent block in the blockchain (the last block added to the blockchain) and adds the hash value of the most recent block into the block header. The consensus node also adds a nonce value, and a timestamp to the block header. The block header is hashed, which becomes the hash value of the block.

In general, PBFT provides a practical Byzantine state machine replication that tolerates Byzantine faults (malfunctioning nodes, malicious nodes, etc.). This is achieved in PBFT by assuming that faults will occur (assuming the existence of independent node failures, and/or manipulated messages sent by consensus nodes). In PBFT, the consensus nodes are provided in a sequence that includes a primary consensus node and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node and verifies that the message was not modified during transmission.

In PBFT, the consensus protocol is provided in multiple phases with all consensus nodes beginning in the same state. To begin, a client sends a request to the primary consensus node to invoke a service operation (execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

A consensus algorithm refers to a specific mechanism or terms, based on which a transaction or a block is verified and validated to be added into a blockchain. To that extent, a consensus algorithm is viewed as a specific implementation agreement adapted to follow rules of a consensus protocol. Different consensus algorithms may be created for different blockchain networks 1212 or different blockchains 1216, which all comply with a same consensus protocol.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can encrypt/decrypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 6, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 6, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

It should also be noted that terms "include", "comprise" or any other variant thereof is intended to cover non-exclusive inclusion, so processes, methods, products or devices that include a series of elements include not only those elements but also other elements that are not explicitly listed, or elements inherent in such processes, methods, products or devices. An element described by "includes a . . . " further includes, without more constraints, another identical element in the process, method, product, or device that includes the element.

A person skilled in the art should understand that the implementations of the present specification can be provided as methods, systems, or computer program products. Therefore, the present application can use a form of hardware only implementations, software only implementations, or implementations with a combination of software and hardware. Further, the implementations of the present specification can take a form of computer program products implemented on one or more computer-usable storage media (including but not limited to a disk storage device, CD-ROM, and an optical storage device) containing computer-usable program code.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A data processing method, comprising:
at a member node of a blockchain network:
obtaining, by a second service server, a first service processing result and a first digital signature that are generated by a first service server, the first digital signature being made by a first authentication module corresponding to the first service server based on at least the first service processing result;
verifying the first digital signature using a first public key of the first authentication module;
performing service processing based on the first service processing result in response to the verification being successful, thereby generating a second service processing result; and
generating a second digital signature by performing digital signing based on at least the second service processing result using a second authentication module corresponding to the second service server,
wherein the first public key is authenticated by the blockchain network, including:
an identity certificate of the first authentication module is stored in a distributed database of the blockchain network; and
the identity certificate includes the first public key of the first authentication module and an electronic signature made by an authentication node of the blockchain network using at least the first public key of the first authentication module.

2. The method according to claim 1, further comprising:
storing at least the second digital signature on the member node in a distributed way.

3. The method according to claim 1, further comprising:
generating a target transaction based on at least the second service processing result and the second digital signature in a blockchain transaction format; and
broadcasting the target transaction to the blockchain network for the target transaction to be verified through a node consensus of the blockchain network and be included in a distributed database of the blockchain network.

4. The method according to claim 1, wherein:
the first authentication module and the second authentication module are a same authentication module;
the first service processing result is a ciphertext encrypted using the first public key of the first authentication module;
the obtaining the first service processing result generated by the first service server includes decrypting the first service processing result using a first private key of the first authentication module, thereby obtaining a plaintext of the first service processing result; and
the method further comprises encrypting the second service processing result using the first public key of the first authentication module.

5. The method according to claim 1, wherein the member node includes a plurality of service servers, the plurality of service servers including the first service server and the second service server.

6. A data processing apparatus of a member node of a blockchain network, the apparatus comprising a processor and a plurality of dedicated logic units configured to be executed by the processor, the plurality of dedicated logic units including:
an acquisition unit, configured to obtain a first service processing result and a first digital signature that are generated by a first service server, the first digital signature being made by a first authentication module corresponding to the first server based on at least the first service processing result;
a verification unit, configured to verify the first digital signature using a first public key of the first authentication module;
a service processing unit, configured to perform service processing based on the first service processing result in response to the verification being successful, thereby generating a second service processing result; and
a digital signing unit, configured to generate a second digital signature by performing digital signing based on at least the second service processing result using the first authentication module corresponding to a second service server,
wherein the first public key is authenticated by the blockchain network, including:
an identity certificate of the first authentication module is stored in a distributed database of the blockchain network; and
the identity certificate includes the first public key of the first authentication module and an electronic signature made by an authentication node of the blockchain network based on using at least the first public key of the first authentication module.

7. The apparatus according to claim 6, further comprising:
a storage unit, configured to store at least the second digital signature on the member node in a distributed way.

8. The apparatus according to claim 6, wherein the plurality of dedicated logic units further include:
a transaction generating unit, configured to generate a target transaction based on at least the second service processing result and the second digital signature in a blockchain transaction format; and
a transaction sending unit, configured to broadcast the target transaction to the blockchain network for the target transaction to be verified through a node consensus of the blockchain network and then included in a distributed database of the blockchain network.

9. The apparatus according to claim 6, wherein the member node includes a plurality of service servers, the plurality of service servers including the first service server and the second service server.

10. The apparatus according to claim 6, wherein the first authentication module and the second authentication module are a same authentication module;
the first service processing result is a ciphertext encrypted using the first public key of the first authentication module;
the acquisition unit is further configured to decrypt the first service processing result using a first private key of the first authentication module, thereby obtaining a plaintext of the first service processing result; and
the apparatus further comprises an encryption unit, configured to encrypt the second service processing result using the first public key of the first authentication module.

11. A computer device, comprising a storage device and a processor, wherein the storage device stores executable instruction that can be run by the processor; and when the processor runs the executable instructions, the processor is configured to implement acts including:
obtaining, by a second service server, a first service processing result and a first digital signature that are generated by a first service server, the first digital signature being made by a first authentication module corresponding to the first service server based on at least the first service processing result;
verifying the first digital signature using a first public key of the first authentication module;
performing service processing based on the first service processing result in response to the verification being successful, thereby generating a second service processing result; and
generating a second digital signature by performing digital signing based on at least the second service processing result using a second authentication module corresponding to the second service server,
wherein the first public key is authenticated by a blockchain network, including:
an identity certificate of the first authentication module is stored in a distributed database of the blockchain network; and
the identity certificate includes the first public key of the first authentication module and an electronic signature made by an authentication node of the blockchain network using at least the first public key of the first authentication module.

12. The computer device according to claim 11, wherein the acts further include:
generating a target transaction based on at least the second service processing result and the second digital signature in a blockchain transaction format; and
broadcasting the target transaction to the blockchain network for the target transaction to be verified through a node consensus of the blockchain network and be included in a distributed database of the blockchain network.

13. The computer device according to claim 11, wherein:
the first authentication module and the second authentication module are a same authentication module;
the first service processing result is a ciphertext encrypted using the first public key of the first authentication module;
the obtaining the first service processing result generated by the first service server includes decrypting the first service processing result using a first private key of the first authentication module, thereby obtaining a plaintext of the first service processing result; and
the acts further include encrypting the second service processing result using the first public key of the first authentication module.

14. The device according to claim 11, wherein the first service server and the second service server each belongs to a member node of the blockchain network.

15. A non-transitory computer readable storage medium storing executable instructions thereon, which when executed by a processor enable the processor to implement acts including:
obtaining, by a second service server, a first service processing result and a first digital signature that are generated by a first service server, the first digital signature being made by a first authentication module corresponding to the first service server based on at least the first service processing result;
verifying the first digital signature using a first public key of the first authentication module;
generating a second service processing result by performing service processing based on the first service processing result in response to the verification being successful; and
generating a second digital signature by performing digital signing based on at least the second service processing result using the first authentication module corresponding to the second service server,
wherein the first public key is authenticated by a blockchain network, including:
an identity certificate of the first authentication module is stored in a distributed database of the blockchain network; and
the identity certificate includes the first public key of the first authentication module and an electronic signature made by an authentication node of the blockchain network using at least the first public key of the first authentication module.

16. The storage medium according to claim 15, wherein the acts further include:
generating a target transaction based on at least the second service processing result and the second digital signature in a blockchain transaction format; and
broadcasting the target transaction to the blockchain network for the target transaction to be verified through a node consensus of the blockchain network and be included in a distributed database of the blockchain network.

17. The storage medium according to claim 15, wherein the acts include storing at least the second digital signature on a member node of the blockchain network.

18. The storage medium according to claim 15, wherein the first service server and the second service server each belongs to a member node of the blockchain network.

19. The storage medium according to claim 15, wherein the acts include:
generating a target transaction based on at least the second service processing result and the second digital signature in a blockchain transaction format; and
broadcasting the target transaction to the blockchain network for the target transaction to be verified through a node consensus of the blockchain network and be included in a distributed database of the blockchain network.

20. The storage medium according to claim 15, wherein:
the first authentication module and the second authentication module are a same authentication module;
the first service processing result is a ciphertext encrypted using the first public key of the first authentication module;
the obtaining the first service processing result generated by the first service server includes decrypting the first service processing result using a first private key of the first authentication module, thereby obtaining a plaintext of the first service processing result; and
the acts further include encrypting the second service processing result using the first public key of the first authentication module.

* * * * *